(12) United States Patent
Burton et al.

(10) Patent No.: US 10,936,661 B2
(45) Date of Patent: Mar. 2, 2021

(54) DATA TREE WITH ORDER-BASED NODE TRAVERSAL

(71) Applicant: Micron Technology, Inc., Boise, ID (US)

(72) Inventors: David Burton, Austin, TX (US); Greg A. Becker, Austin, TX (US); Alexander Tomlinson, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 119 days.

(21) Appl. No.: 16/232,422

(22) Filed: Dec. 26, 2018

(65) Prior Publication Data

US 2020/0210482 A1    Jul. 2, 2020

(51) Int. Cl.
*G06F 7/00* (2006.01)
*G06F 16/901* (2019.01)
*G06F 16/903* (2019.01)

(52) U.S. Cl.
CPC ........ *G06F 16/9027* (2019.01); *G06F 16/903* (2019.01); *G06F 16/9024* (2019.01)

(58) Field of Classification Search
CPC . G06F 16/9027; G06F 16/903; G06F 16/9024
USPC .................................. 707/600–899
See application file for complete search history.

(56) References Cited

U.S. PATENT DOCUMENTS

| | | | |
|---|---|---|---|
| 5,204,958 A | 4/1993 | Cheng et al. | |
| 5,530,850 A | 6/1996 | Ford et al. | |
| 6,175,835 B1 | 1/2001 | Shadmon | |
| 6,597,957 B1 | 7/2003 | Beakley | |
| 8,738,657 B2 | 5/2014 | Kuno et al. | |
| 9,075,710 B2 | 7/2015 | Talagala et al. | |
| 9,367,260 B1 | 6/2016 | Natanzon | |
| 9,400,816 B1 | 7/2016 | Gubarev et al. | |
| 9,858,301 B1 | 1/2018 | Hardy et al. | |
| 10,235,257 B1 | 3/2019 | Danilov et al. | |
| 10,706,105 B2 | 7/2020 | Boles | |
| 10,706,106 B2 | 7/2020 | Boles et al. | |
| 10,719,495 B2 | 7/2020 | Boles et al. | |
| 10,725,988 B2 | 7/2020 | Boles et al. | |
| 2005/0165865 A1 | 7/2005 | Farmer | |

(Continued)

FOREIGN PATENT DOCUMENTS

| CN | 101515298 B | 9/2013 |
|---|---|---|
| CN | 105095287 A | 11/2015 |

(Continued)

OTHER PUBLICATIONS

Clements, Austin T, et al., "Scalable Address Spaces Using RCU Balanced Trees", (2012), 12 pgs.

(Continued)

*Primary Examiner* — Isaac M Woo
(74) *Attorney, Agent, or Firm* — Schwegman Lundberg & Woessner, P.A.

(57) ABSTRACT

Aspects of the present disclosure provide for operations for a tree data structure that provides order-based node traversal. For some embodiments, the tree data structure stores one or more key-value pairs, implements at least one linked-list data structure, and enables traversal of nodes within the tree data structure based on a key order (e.g., forward or reverse key order).

20 Claims, 9 Drawing Sheets

(56) References Cited

U.S. PATENT DOCUMENTS

| | | |
|---|---|---|
| 2005/0171960 A1 | 8/2005 | Lomet |
| 2008/0016066 A1 | 1/2008 | Kuznetsov et al. |
| 2010/0146003 A1 | 6/2010 | Bruso et al. |
| 2010/0246446 A1 | 9/2010 | Du et al. |
| 2011/0246503 A1 | 10/2011 | Bender et al. |
| 2012/0011106 A1* | 1/2012 | Reid ............... G06F 9/466 707/695 |
| 2012/0072656 A1 | 3/2012 | Archak et al. |
| 2012/0223889 A1 | 9/2012 | Medlock et al. |
| 2013/0080473 A1 | 3/2013 | Kuno et al. |
| 2013/0117524 A1 | 5/2013 | Helman et al. |
| 2013/0204902 A1 | 8/2013 | Wang et al. |
| 2013/0218840 A1 | 8/2013 | Smith et al. |
| 2013/0275656 A1 | 10/2013 | Talagala et al. |
| 2013/0306276 A1 | 11/2013 | Duchesneau |
| 2014/0064490 A1 | 3/2014 | Wang et al. |
| 2014/0074841 A1 | 3/2014 | Majnemer et al. |
| 2014/0082028 A1 | 3/2014 | Sivasubramanian et al. |
| 2014/0129530 A1 | 5/2014 | Raufman |
| 2014/0222870 A1 | 8/2014 | Zhang |
| 2014/0279944 A1 | 9/2014 | Ghandeharizadeh et al. |
| 2014/0344287 A1 | 11/2014 | Carvalho et al. |
| 2015/0058291 A1 | 2/2015 | Earl et al. |
| 2015/0127658 A1 | 5/2015 | Ding et al. |
| 2015/0178375 A1 | 6/2015 | Ishizaki |
| 2015/0244558 A1 | 8/2015 | Tully et al. |
| 2015/0254272 A1 | 9/2015 | Regni et al. |
| 2015/0286695 A1 | 10/2015 | Kadayam et al. |
| 2015/0293958 A1 | 10/2015 | Chen et al. |
| 2015/0347495 A1 | 12/2015 | Wang et al. |
| 2016/0026666 A1 | 1/2016 | Namiki |
| 2016/0173445 A1 | 6/2016 | Mosko et al. |
| 2016/0275094 A1 | 9/2016 | Lipcon |
| 2016/0335299 A1 | 11/2016 | Vemulapati et al. |
| 2017/0017411 A1 | 1/2017 | Choi et al. |
| 2017/0141791 A1 | 5/2017 | Balegar et al. |
| 2017/0185622 A1 | 6/2017 | Prahlad et al. |
| 2017/0192989 A1 | 7/2017 | Georgiev et al. |
| 2017/0212680 A1 | 7/2017 | Waghulde |
| 2018/0011766 A1 | 1/2018 | Lee et al. |
| 2018/0067975 A1 | 3/2018 | Kato et al. |
| 2018/0089074 A1 | 3/2018 | Li et al. |
| 2018/0225315 A1 | 8/2018 | Boles et al. |
| 2018/0225316 A1 | 8/2018 | Boles et al. |
| 2018/0225321 A1 | 8/2018 | Boles et al. |
| 2018/0225322 A1 | 8/2018 | Boles et al. |
| 2018/0253386 A1 | 9/2018 | Qiu et al. |
| 2019/0034427 A1 | 1/2019 | Trika et al. |
| 2019/0065557 A1 | 2/2019 | Boles et al. |
| 2020/0004851 A1 | 1/2020 | Lambov |
| 2020/0117728 A1 | 4/2020 | Tomlinson et al. |
| 2020/0117744 A1 | 4/2020 | Tomlinson |
| 2020/0192590 A1 | 6/2020 | Kurichiyath et al. |
| 2020/0192940 A1 | 6/2020 | Tomlinson |
| 2020/0257669 A1 | 8/2020 | Boles et al. |

FOREIGN PATENT DOCUMENTS

| | | |
|---|---|---|
| CN | 110268394 A | 9/2019 |
| CN | 110268399 A | 9/2019 |
| CN | 110291518 A | 9/2019 |
| CN | 110383261 A | 10/2019 |
| KR | 20130018602 A | 2/2013 |
| KR | 20130115929 A | 10/2013 |
| KR | 20170008152 A | 1/2017 |
| TW | 200421114 A | 10/2004 |
| TW | 200822066 A | 5/2008 |
| TW | 200836084 A | 9/2008 |
| TW | 201342088 A | 10/2013 |
| TW | 201408070 A | 2/2014 |
| TW | 1454166 B | 9/2014 |
| TW | 201837720 A | 10/2018 |
| TW | 201841122 A | 11/2018 |
| TW | 201841123 A | 11/2018 |
| TW | 201842454 A | 12/2018 |
| WO | WO-2018148149 A1 | 8/2018 |
| WO | WO-2018148151 A1 | 8/2018 |
| WO | WO-2018148198 A1 | 8/2018 |
| WO | WO-2018148203 A1 | 8/2018 |
| WO | WO-2020076580 A1 | 4/2020 |
| WO | WO-2020076581 A1 | 4/2020 |
| WO | WO-2020123628 A1 | 6/2020 |
| WO | WO-2020123632 A1 | 6/2020 |

OTHER PUBLICATIONS

"International Application Serial No. PCT/US2019/054243, International Search Report dated Jan. 22, 2020", 3 pgs.

"International Application Serial No. PCT/US2019/054243, Written Opinion dated Jan. 22, 2020", 4 pgs.

"International Application Serial No. PCT/US2019/054254, International Search Report dated Jan. 15, 2020", 3 pgs.

"International Application Serial No. PCT/US2019/054254, Written Opinion dated Jan. 15, 2020", 4 pgs.

"Taiwanese Application Serial No. 107104242, Response filed Jan. 2, 2020 to Office Action dated Oct. 2, 2019", w/ English Claims, 103 pgs.

"Taiwanese Application Serial No. 107104566, Decision of Rejection dated Jan. 20, 2020", w/ English Translation, 7 pgs.

"International Application Serial No. PCT/US2018/016892, International Search Report dated Jun. 4, 2018", 3 pgs.

"International Application Serial No. PCT/US2018/016892, Written Opinion dated Jun. 4, 2018", 9 pgs.

"International Application Serial No. PCT/US2018/016906, International Search Report dated Jun. 4, 2018", 3 pgs.

"International Application Serial No. PCT/US2018/016906, Written Opinion dated Jun. 4, 2018", 9 pgs.

"International Application Serial No. PCT/US2018/017043, International Search Report dated May 28, 2018", 3 pgs.

"International Application Serial No. PCT/US2018/017043, Written Opinion dated May 28, 2018", 7 pgs.

"International Application Serial No. PCT/US2018/017056, International Search Report dated Jun. 4, 2018", 4 pgs.

"International Application Serial No. PCT/US2018/017056, Written Opinion dated Jun. 4, 2018", 7 pgs.

"NVM Express Revision 1.2 specification", NVM Express, [Online] Retrieved from the internet: <http://nvmexpress.org/resources/specifications>, (Nov. 3, 2014), 1-205.

"Taiwanese Application Serial No. 107104242, Office Action dated Feb. 25, 2019", w/ English Translation, 22 pgs.

"Taiwanese Application Serial No. 107104242, Response filed Jun. 4, 2019 to Office Action dated Feb. 25, 2019", w/ English Claims, 105 pgs.

"Taiwanese Application Serial No. 107104545, First Office Action dated Apr. 11, 2019", w/ English translation, 44 pgs.

"Taiwanese Application Serial No. 107104545, Office Action dated Dec. 21, 2018", W/ English Translation, 17 pgs.

"Taiwanese Application Serial No. 107104545, Response filed Mar. 19, 2019 to Office Action dated Dec. 21, 2018", w/English Claims, 15 pgs.

"Taiwanese Application Serial No. 107104545, Response filed Jul. 12, 2019 to First Office Action dated Apr. 11, 2019", w/ English Claims, 124 pgs.

"Taiwanese Application Serial No. 107104550, Office Action dated Jan. 9, 2019", W/ English Translation, 28 pgs.

"Taiwanese Application Serial No. 107104550, Response filed Apr. 11, 2019 to Office Action dated Jan. 9, 2019", w/ English Claims, 93 pgs.

"Taiwanese Application Serial No. 107104566, First Office Action dated Feb. 14, 2019", w/ English Translation, 36 pgs.

"Transaction Log", Wikipedia, (Accessed on Apr. 8, 2019), 3 pgs.

"Xingbo Wu and Yuehai Xu", LSM-trie: An LSM-tree-based Ultra-Large Key-Value Store for Small Data, https://www.usenix.org/system/files/conference/atc15/atc15-paper-wu.pdf, (Jul. 8-10, 2015), 13 pgs.

(56) References Cited

OTHER PUBLICATIONS

Amur, Hrishikesh, et al., "Design of a Write-Optimized Data Store", [Online] Retrieved from the Internet: <https://smartech.gatech.edu/handle/1853/53627>, (2013), 12 pgs.
Ghosh, Mainak, et al., "Fast Compaction Algorithms for NoSQL Databases", IEEE 35th International Conference on Distributed Computing Systems, (2015), 10 pgs.
Kang, Jeong-Uk, et al., "The Multi-streamed Solid-State Drive", 5 pgs.
Lim, Heyontaek, et al., "Towards Accurate and Fast Evaluation of Multi-Stage Log-Structured Designs", USENIX Association 14th USENIX Conference on File and Storage Technologies FAST 16, (2016), 149-166.
Lu, Lanyue, et al., "WiscKey: Separating Keys from Values in SSD-conscious Storage", 14th USENIX Conference, (2016), 17 pgs.
O'Neil, Patrick E., et al., "The Log-Structured Merge-Tree", ACTA Informatica 33(4), (1996).
Papapetrou, Odysseas, et al., "Cardinality estimation and dynamic length adaptation for Bloom filters", 34 pgs.
Peng, Wang, et al., "An Efficient Design and Implementation of LSM-Tree based Key-Value Store on Open-Channel SSD", Proceedings of the Ninth European Conference on Computer Systems (EuroSys 2014), Article No. 6, (Apr. 2014), 14 pgs.
Putze, Felix, et al., "Cache-, Hash- and Space-Efficient Bloom Filters", (2007), 14 pgs.
Trong-Dat, Nguyen, et al., "Opportunity of using Multi-Streamed SSD in MongoDB", In: Korea Computer Congress 2016, [Online] Retrieved from the internet: <http://www.dbpia.co.kr/Article/NODE07018146>, (Jun. 2016), 169-171.
Xingbo, Wu, et al., "LSM-tries: An LSM-tree-based Ultra-Large Key-Value Store for Small Data", Proceedings of 2015 USENIX Annual Technical Conference,, (Jul. 8-10, 2015), 71-82.
Yuzhe, Tang, et al., "Deferred Lightweight Indexing for Log-Structured Key-Value Stores", 15th IEEE/ACM International Symposium on Cluster, Cloud and Grid Computing (CCGrid), (May 4-7, 2015), 10 pgs.
"International Application Serial No. PCT/US2018/016892, International Preliminary Report on Patentability dated Aug. 22, 2019", 11 pgs.
"International Application Serial No. PCT/US2018/016906, International Preliminary Report on Patentability dated Aug. 22, 2019", 11 pgs.
"International Application Serial No. PCT/US2018/017043, International Preliminary Report on Patentability dated Aug. 22, 2019", 9 pgs.
"International Application Serial No. PCT/US2018/017056, International Preliminary Report on Patentability dated Aug. 22, 2019", 9 pgs.
"Taiwanese Application Serial No. 107104242, Office Action dated Oct. 2, 2019", w/ English translation, 31 pgs.
"Taiwanese Application Serial No. 107104545, Voluntary Amendment Filed Sep. 5, 2019", w/ English Claims, 113 pgs.
"Taiwanese Application Serial No. 107104566, Response filed Aug. 15, 2019 to First Office Action dated Feb. 14, 2019", w/ English Claims, 104 pgs.
U.S. Appl. No. 15/428,877, filed Feb. 9, 2017, KVS Tree.
U.S. Appl. No. 15/428,912, filed Feb. 9, 2017, Merge Tree Garbage Metrics.
U.S. Appl. No. 15/428,951, filed Feb. 9, 2017, Merge Tree Modifications for Maintenance Operations.
U.S. Appl. No. 15/428,976, filed Feb. 9, 2017, Stream Selection for Multi-Stream Storage Devices.
U.S. Appl. No. 16/220,646, filed Dec. 14, 2017, Key-Value Store Using Journaling With Selective Data Storage Format.
U.S. Appl. No. 16/156,440, filed Oct. 10, 2018, Key-Value Store Tree Data Block Spill With Compaction.
U.S. Appl. No. 16/220,729, filed Dec. 14, 2018, Key-Value Store Tree With Selective Use of Key Portion.
U.S. Appl. No. 16/156,400, filed Oct. 10, 2018, Counter-based Compaction of Key-Value Store Tree Data Block.
"International Application Serial No. PCT/US2019/065692, International Search Report dated Apr. 3, 2020", 3 pgs.
"International Application Serial No. PCT/US2019/065692, Written Opinion dated Apr. 3, 2020", 4 pgs.
"International Application Serial No. PCT/US2019/065702, International Search Report dated Apr. 3, 2020", 3 pgs.
"International Application Serial No. PCT/US2019/065702, Written Opinion dated Apr. 3, 2020", 5 pgs.
"Taiwanese Application Serial No. 107104566, Response filed Jul. 28, 2020 to Decision of Rejection dated Jan. 20, 2020", w/ English Claims, 36 pgs.
Bagwell, Phil, "Ideal Hash Trees", EPFL Technical Report, (2001), 19 pgs.
U.S. Appl. No. 16/856,920, filed Apr. 23, 2020, KVS Tree.
U.S. Appl. No. 16/921,371, filed Jul. 6, 2020, Merge Tree Garbage Metrics.
U.S. Appl. No. 16/921,309, filed Jul. 6, 2020, Merge Tree Modifications for Maintenance Operations.
U.S. Appl. No. 16/933,532, filed Jul. 20, 2020, Stream Selection for Multi-Stream Storage Devices.
"Korean Application Serial No. 10-2019-7026327, Notice of Preliminary Rejection dated Oct. 19, 2020", w English translation, 20 pgs.
"Korean Application Serial No. 10-2019-7026304, Notice of Preliminary Rejection dated Nov. 30, 2020", w English translation, 9 pgs.
"Korean Application Serial No. 10-2019-7026330, Notice of Preliminary Rejection dated Nov. 30, 2020", w English translation, 10 pgs.
"Korean Application Serial No. 10-2019-7026533, Notice of Preliminary Rejection dated Dec. 26, 2020", w English translation, 12 pgs.
"Korean Application Serial No. 10-2019-7026327, Response filed Dec. 18, 2020 to Notice of Preliminary Rejection dated Oct. 19, 2020", w English Claims, 51 pgs.

\* cited by examiner

US 10,936,661 B2

DATA TREE WITH ORDER-BASED NODE TRAVERSAL

TECHNICAL FIELD

Embodiments of the disclosure relate generally to memory sub-systems and more specifically, to operations for a tree data structure (e.g., bonsai data tree) that provides order-based node traversal, which can enable lockless iteration of the tree data structure.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
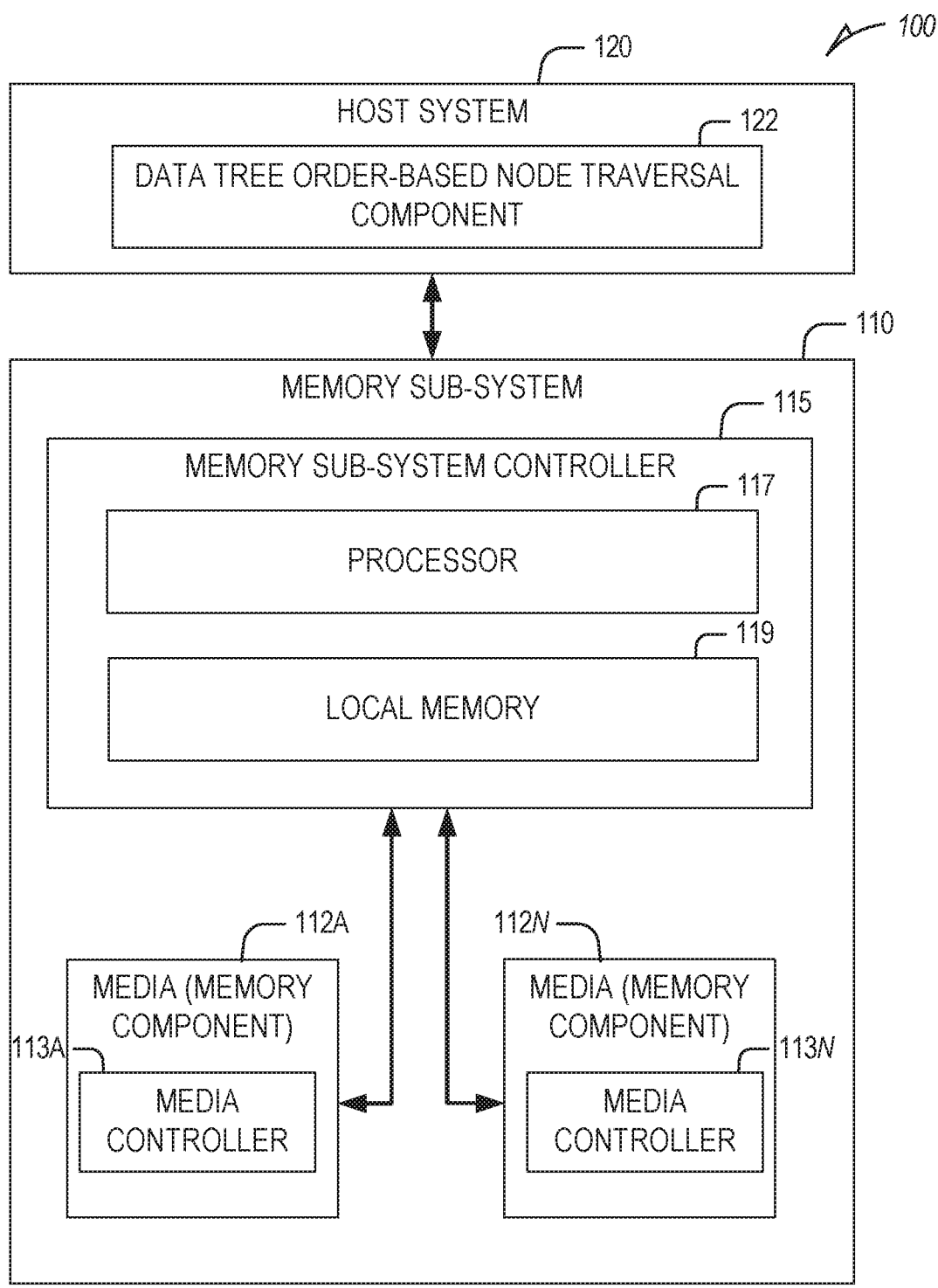
FIG. 1 is a block diagram illustrating an example computing environment including a memory sub-system, in accordance with some embodiments of the present disclosure.

Aspects of the present disclosure are directed to operations for a tree data structure (e.g., binary tree data structure, such as a bonsai data tree) that provides order-based node traversal. A memory sub-system is also hereinafter referred to as a "memory device." An example of a memory sub-system is a storage system, such as a SSD. In some embodiments, the memory sub-system is a hybrid memory/storage sub-system. In general, a host system can utilize a memory sub-system that includes one or more memory components. The host system can provide data (e.g., via write requests) to be stored at the memory sub-system and can request data to be retrieved (e.g., via read requests) from the memory sub-system.

A memory sub-system can include multiple memory components that can store data from the host system. The memory sub-system can further include a memory sub-system controller that can communicate with each of the memory components to perform operations such as reading data, writing data, or erasing data at the memory components in response to requests received from the host system. Any one or more of the memory components of the memory sub-system may include a media controller to manage memory cells of the memory component, communicate with the memory sub-system controller, and execute memory requests (e.g., read or write) received from the memory sub-system controller.

In some applications, such as database storage and volume data storage (e.g., cloud storage), key-value data structures are used to store data on data storage media, such as a pool of data storage media (media pool) implemented by one or more memory devices and presented as a single logical data storage volume comprising one or more media data blocks (media blocks). A key-value store (KVS) can comprise one or more key-value data structures to store and search for key-value pairs. The key-value data structures can permit efficient searches of stored data of key-value pairs, permit efficient storage of sparse data, or permit efficient storage of searchable data. Generally, key-value data structures accept a key-value pair for storage and are configured to respond to queries for a value based on a key. Key-value data structures may comprise such structures as tree data structures, examples of which include log-structured merge tree (LSM tree) and a key-value store (KVS) tree (also referred to herein as a key-value store tree data structure or KVS tree data structure).

As used herein, a tree data structure comprises one or more nodes with connections between parent and child nodes. A binary tree data structure (also referred to herein as a binary data tree) comprises a tree data structure where each node has at most two child nodes, which can be referred to as a first child node (e.g., left child node) and a second child node (e.g., right child node). An example of a binary tree data structure may include a bonsai tree data structure (also referred to herein as a bonsai data tree or bonsai tree) as described by Clements, A., Kaashoek, M., Zeldovich, N., "Scalable Address Spaces Using RCU Balanced Trees", ASPLOS 2012. As used herein, a bonsai tree data structure may be balanced and may use a read-copy-update (RCU) mechanism to permit concurrent/parallel data operations (e.g., read and write operations) to be performed with respect to the bonsai tree data structure. For instance, according to some embodiments, the bonsai tree data structure comprises an RCU-balanced tree that permits two or more lockless concurrent data readers that are concurrent with a single data writer.

Additionally, the bonsai tree data structure may provide lockless insertion of nodes, lockless deletion of nodes, and lockless lookup of nodes. Various embodiments described herein enable nodes of a tree data structure (e.g., a bonsai tree data structure) to be read in order (e.g., iterate through nodes), such as in forward or reverse order. For instance, an embodiment may enable nodes of a tree data structure storing key-value pair data to be read in key order (e.g., forward or reverse key order). Additionally, some embodiments described herein enable nodes of a tree data structure to be read in order without need of a lock.

Use of some embodiments enable a tree data structure (e.g., bonsai tree data structure) storing key-value pair data to be searched from first to last key (or last to first key) without need to visit a node of the tree data structure more than once. Some such embodiments can improve performance of a system that uses (e.g., needs to iterate through) the tree data structure, and can prevent loss of concurrency. By some embodiments, the tree data structure can be updated by one process (e.g., writer) while concurrently being read by one or more processes (e.g., readers or iterators). Some embodiments extend a tree data structure, storing one or more key-value pairs, to provide a way to iterate the tree data structure (e.g., live tree data structure that is being updated by a concurrent writer while being read by two or more concurrent readers) in key order (e.g., first-to-last key or last-to-first key).

For some embodiments, a tree data structure described herein stores key-value data as part of a key-value store (KVS), which may comprise an in-memory data storage layer (hereafter, in-memory layer), a long-term data storage layer (hereafter, long-term layer) (e.g., non-journal data storage layer), a journal data storage layer (hereafter, journal layer), or some combination thereof. For example, each of one or more layers of the KVS may comprise a sequence of key-value sets (also referred to herein as a kvsets), where each kvset comprises a tree data structure (e.g., bonsai tree data structure) described herein. Each sequence of kvsets may be temporally ordered, where later key-value sets in the sequence can represent older key-value sets. Each kvset can comprise one or more key-value pairs, which permit values to be stored in the kvset with corresponding keys that reference the values. Various embodiments enable one or more operations (e.g., cursor operations) that read (e.g. iterate through) key-value pairs stored on a tree data structure according to a key order (e.g., forward or reverse key order).

Aspects of the present disclosure provide various embodiments where a tree data structure implements one or more linked-list data structures, each of which enables nodes within the tree data structure to be traversed according to an order (e.g., key order) without need of visiting a given node more than once (e.g., without need to traverse back up the tree data structure to traverse down another branch of the tree data structure). For example, for some embodiments, the one or more linked-listed data structures include one linked-listed data structure that permits forward iteration of nodes (e.g., in forward order) of the tree data structure, and another linked-listed data structure that permits reverse iteration of nodes (e.g., in reverse order) of the tree data structure. The tree data structure, for instance, may store key-value data, and comprise one linked-listed data structure that permits iteration of nodes in forward key order and another linked-listed data structure that permits iteration of nodes in reverse key order. To support read-copy-update (RCU) functionality (e.g., lockless concurrent data readers and lockless single data writer), a given reader (e.g., cursor mechanism) may be limited to traversing in only one direction (once a direction is selected) using a single linked-list data structure.

To implement a plurality of linked-list data structures, the tree data structure of some embodiments comprises one or more nodes, where each given node comprises a set of pointers to child nodes of the given node and, separately, a pointer for each linked-list data structure implemented by the tree data structure. For instance, where the tree data structure comprises a binary tree data structure, a given node of the tree data structure may comprise a first pointer to a first child node (e.g., left child node) of the node and a second pointer to a second child node (e.g., right child node) of the node. For a given node, a pointer included by the given node and associated with a particular linked-list data structure can enable the given node to form part of the particular linked list (by enabling the given node to point to another node that forms part of the particular linked list). For instance, where the tree data structure stores key-value data, a given node of the tree data structure may comprise a first pointer (e.g., called a next pointer) to implement a first linked list of nodes within the tree data structure for traversing nodes in forward key order, and may comprise a second pointer (e.g., called a previous pointer) to implement a second linked list of nodes within the tree data structure for traversing nodes in reverse key order. In another example, a given node of the tree data structure may comprise a third pointer (e.g., called a next pointer) to implement a third linked list of nodes within the tree data structure for traversing nodes in forward value order, and may comprise a fourth pointer (e.g., called a previous pointer) to implement a fourth linked list of nodes within the tree data structure for traversing nodes in reverse value order.

As noted herein, the tree data structure described herein may be used within a KVS to store key-value pairs. For example, the KVS may comprise one or more of an in-memory layer, a long-term layer, and an (intermediate) journal layer positioned between the in-memory layer. Each layer may be a logical layer implemented by software, hardware, or a combination of both. According to some embodiments, the in-memory layer comprises one or more tree data structures (e.g., bonsai data trees) described herein for temporary data storage of one or more key-value pairs on volatile memory (e.g., random access memory (RAM)), and may further facilitate search of key-value pairs in the in-memory layer. The journal layer may comprise one or more key-value data structures for journaling (on persistent data storage space of non-volatile memory) one or more key-value pairs from the in-memory layer, and the long-term layer may comprise one or more key-value data structures for long-term/bulk data storage (on persistent data storage space of non-volatile memory) of one or more key-value pairs from the journal layer. Within the KVS, the journal layer may provide data consistency and durability, which may be required by software applications that use the KVS as a storage stack. In particular, the KVS may periodically synchronize (e.g., every 5 microseconds) its data content from the in-memory layer to persistent data storage (e.g., on media pool) to achieve data consistency and durability; the journal layer can serve as the intermediate persistent data storage to avoid frequent and sub-optimal input/output operations (IOs) to the long-term layer, which may prefer receiving larger data payload sizes for storage than would be typically provided by the in-memory layer.

For some embodiments, the in-memory layer operates as an in-memory node that stores a sequence of key-value sets (as described herein), the long-term layer comprises a KVS tree data structure (as described herein) that operates one or more persistent nodes, and the journal layer operates as an intermediate node that logically couples the in-memory node (of the journal layer) to the root node of the KVS tree data structure (of the long-term layer). Through such an arrangement (e.g., storage stack), KVS operations that result in key-value pairs (e.g., a new key-value pair, a modified key-value pair, or deleted key-value pair) can initially enter the KVS through the top node of the in-memory layer, flow from the top node of the in-memory layer to the intermediate node of the journal layer (e.g., to facilitate consistency and durability for key-pair data stored in the in-memory layer), same flow from the intermediate layer of the journal layer to the root node (of the KVS tree data structure) of the long-term layer (e.g., to facilitate eventual long-term data storage for key-pair data stored in the journal layer). Eventually, key-value pair data can flow from the root node of the KVS tree data structure to one or more child nodes of the KVS tree data structure. For some embodiments, the long-term layer comprises a plurality of heterogeneous KVS tree data structures (e.g., disjointed KVS tree data structure), where the plurality of KVS tree data structures forms a key-value database (hereafter, KVDB). The KVDB may comprise a root node connected to a plurality of child nodes that each operates as a root node for a different heterogeneous KVS tree data structure. The root node can receive heterogeneous key-value pairs from the journal layer and flow down to their respective KVS tree data structure.

Depending on the embodiment, the in-memory layer may comprise a sequence of kvsets, the journal layer may comprise a sequence of kvsets, and the long-term layer may comprise a sequence of kvsets. Each sequence of kvsets may be temporally ordered, where later key-value sets in the sequence can represent older key-value sets. Each kvset can comprise one or more key-value pairs, which permit values to be stored in the kvset with corresponding keys that reference the values. As noted herein, a given kvset may comprise a tree data structure for storage of key-value-pairs. The key-value pairs within a given kvset may be key-sorted. Every key within a given kvset may be unique from the other keys in the kvset. Each kvset may be immutable once written, but the kvset may be deleted or some or all of the kvset's data contents may be added to a new kvset.

For some embodiments, each kvset of a given data storage layer (e.g., in-memory layer) comprises a tree data structure as described herein for storing one or more key-value pairs. An example tree data structure may include a binary tree data structure (e.g., bonsai tree data structure), which may be balanced and may support RCU semantics. With a binary tree data structure, such as a bonsai data tree, the kvset of an in-memory layer may function as a container for put or delete operations of key-value pairs (e.g., based on requests from a software application), thereby facilitating storage of those key-value pairs, searchability of those key-value pairs (e.g., search in log time), and high concurrency of operations to the stored key-value pairs (e.g., with RCU semantics). By receiving and storing put or delete operations with respect to key-value pairs, the bonsai data tree can reflect mutations to key-value pairs over time.

For some embodiments, the long-term layer comprises a KVS tree that comprises a set of nodes that each comprises a sequence of kvset. As used herein, a KVS tree comprises a tree data structure comprising nodes with connections between parent and child nodes based on a predetermined derivation of a key (e.g., rather than the content of the tree). Each node can comprise an ordered (e.g., temporally ordered) sequence of key-value sets (also referred to herein as kvsets). As noted herein, where temporally ordered, later key-value sets in the sequence can represent older key-value sets. The kvsets can comprise one or more key-value pairs, which permit values to be stored in the KVS tree with corresponding keys that reference the values. Accordingly, within a KVS tree, kvsets function as individual key and value stores organized in the nodes of the KVS tree. The key-value pairs within a given kvset may be key-sorted. Every key within a given kvset may be unique from the other keys in the kvset; however, keys within the KVS tree may not be unique (e.g., two different kvsets within a single node or in different nodes of the KVS tree may include the same key). Each kvset may be immutable once written to a node (e.g., once placed/stored in a node, a kvset does not change). Though a kvset within a node may be immutable, the kvset may be deleted, or some or all of the kvset's data contents may be added to a new kvset.

For some embodiments, each kvset stored in a KVS tree (of the long-term layer) comprises a key tree to store key entries of key-value pairs of the kvset, where a given key entry may comprise both a key and a reference to a value. A variety of data structures may be used to efficiently store and retrieve unique keys in the key tree (e.g., it may not even be a data tree), such as binary search trees, B-trees, etc. For example, the keys are stored in leaf nodes of the key tree, where a maximum key in any subtree of the key tree may be in a rightmost entry of a rightmost child, a rightmost edge of a first node of the key tree is linked to a sub-node of the key tree, and all keys in a subtree rooted at the sub-node of the key tree may be greater than all keys in the first node of the key tree.

For some embodiments, for a kvset stored in a KVS tree, key entries are stored in a set of key data blocks (also referred to as key blocks or kblocks), which can comprise a primary key block and zero or more extension key blocks. Members of the set of key blocks may correspond to media data blocks (media blocks) for a data storage medium implemented by a memory device, such as an SSD, hard disk drive, etc. Each key block may comprise a header to identify it as a key block, and a primary key block of a kvset may comprise a list of media block identifications for the one or more extension key blocks of the kvset.

A primary key block may comprise a header to a key tree of the kvset. The header may comprise a number of values to assist or facilitate interactions with the keys, or kvset. For example, the primary key block, or header stored therein, may comprise a copy of a lowest key in a key tree of the kvset, or a copy of a highest key in a key tree of the kvset. The primary key block may comprise a list of media block identifications for a key tree of the kvset. Additionally, the primary key block may comprise a bloom filter header for a bloom filter of the kvset, and the primary key block may comprise a list of media block identifications for a bloom filter of the kvset.

For some embodiments, for a kvset stored in a KVS tree, values are stored in a set of value data blocks (also referred to herein as value blocks or vblocks). Each particular value block in a KVS tree may have a data generation number associated with it that indicates a sequence order at which the particular value block was initially generated for the KVS tree. In this way, the data generation number of a particular value block can serve as a time stamp for when the particular value block is initially generated. For instance, data generation numbers may start at a value of "1" for the first value block generated and added to (e.g., a kvset of) a root node of the KVS tree, and the second value block generated and added to (e.g., a kvset of) the root node of the KVS tree would have a data generation number of "2," The data generation number increases with each new value block that is generated and added to the KVS tree through the root node.

Members of the set of value blocks may correspond to media data blocks (media blocks) for a data storage medium implemented by a memory device, which as noted herein can comprise an SSD, hard disk drive, etc. Each value block may comprise a header to identify it as a value block. A value block may comprise a storage section to one or more values without separation between, where bits of a first value can run into bits of a second value on the data storage medium without a guard, container, or other delimiter between them. For various embodiments, a primary key block of a kvset comprises a list of media block identifications for value blocks in the set of value blocks for the kvset. In this way, a primary key block can manage storage references to value blocks within a kvset.

Disclosed herein are some examples of systems that perform operations relating to operations for a tree data structure (e.g., bonsai data tree) that provides order-based node traversal.

FIG. 1 illustrates an example computing environment 100 including a memory sub-system 110, in accordance with some examples of the present disclosure. The memory sub-system 110 can include media, such as memory components 112A to 112N. The memory components 112A to 112N can be volatile memory devices, non-volatile memory devices, or a combination of such. In some embodiments, the memory sub-system 110 is a storage system. An example of a storage system is an SSD. In some embodiments, the memory sub-system 110 is a hybrid memory/storage system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or other such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or a direct communicative connection (e.g., without intervening components), whether wired or wireless, including connections such as electrical, optical, magnetic, and so forth. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component can include both an SLC portion and an MLC portion of memory cells. Each of the memory cells can store one or more bits of data (e.g., data blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative- or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory components 112A to 112N.

Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The host system 120 includes a data tree with order-based node traversal component 122 (hereafter, data tree component 122) that enables or otherwise facilitates use, in the example computing environment, of a tree data structure supporting order-based node traversal as described herein. The tree data structure may be used for storage of data (e.g., key data or value data of a key-value pair), and may be part of a key-value store (KVS) implemented in the example computing environment. Depending on some embodiments, an in-memory layer as described herein may be implemented on the host system 120 (e.g., volatile memory on the host system 120, such as the local memory 119), and both a journal layer and a long-term layer as described herein may be implemented on the memory sub-system 110.

For some embodiments, the data tree component 122 receives a key-value pair comprising a particular key and an associated value. The data tree component 122 may receive the key-value pair in response to a client request on the host system 120 (e.g., request from a software application on the host system 120). An example of the client request may include, without limitation, a client request for a put operation (e.g., new key-value pair or modified key-value pair) or delete operation (e.g., already stored key-value pair) with respect to the key-value pair.

In response to receiving the key-value pair, the data tree component 122 may generate, for a tree data structure (e.g., binary tree data structure), a new node associated with the particular key of the key-value pair. Eventually, the data tree component 122 can insert the new node into the tree data structure. For some embodiments, the tree data structure comprises a binary tree data structure, such as a bonsai tree data structure. Further, for some embodiments, the tree data structure comprises a RCU mechanism to control concurrent data access to the binary tree data structure by a plurality of processes (e.g., read processes). Inserting the new node into the tree data structure may comprise using an RCU mechanism.

According to some embodiments, the new node generated by the data tree component 122 comprises a set of child pointers to point to one or more child nodes of the new node in the tree data structure, and a set of linked-listed pointers to point to one or more adjacent nodes of linked lists associated with the set of linked-listed pointers implemented within the tree data structure. For example, for various embodiments, the tree data structure comprises a binary tree data structure (e.g., bonsai tree data structure), and the set of child pointers comprises a first pointer to point to a first child node (e.g., left child node) of the new node, and a second pointer to point to a second child node (e.g., right child node) of the new node. Depending on the embodiment, the new node can include a pointer to the particular key of the key-value pair, and can include a pointer to the particular value of the key-value pair, thereby associating the new node with the key-value pair received by the data tree component 122.

For some embodiments, each pointer in the set of linked-list pointers implements a separate linked list of nodes within the tree data structure, where the nodes are organized according to an order (e.g., a key order or a value order). For instance, the set of linked-listed pointers may comprise a next pointer to point to a next node in the tree data structure based on a forward key order in this way, the next pointer may represent a pointer, in the set of linked-listed pointers, that implements (and, thus, is associated with) a linked-list for forward key order traversal of nodes within the tree data structure. In another instance, the set of linked-listed pointers may comprise a previous pointer to point to a previous node in the binary tree data structure based on a reverse key order. In this way, the previous pointer may represent a pointer, in the set of linked-listed pointers, that is associated with a linked list for reverse key order traversal of nodes within the tree data structure. For some embodiments, the set of linked-listed pointers comprises the next pointer and the previous pointer, such that based on a key order (e.g., consecutive key order), the particular key associated with the key-value pair of the new node is adjacent to (e.g., in between) both a first key associated with the previous node and a second key associated with the next node. For instance, the first key may comprise a higher value than the particular key, and the second key may comprise a lower value than the particular key.

For some embodiments, the data tree component 122 can receive a search request (e.g., a request from a software application on the host system 120) comprising an initial search key. The initial search key may comprise a key prefix that includes a beginning portion of a key (e.g., key starting with the value "TEST" will match with keys "TESTCASE," "TESTING," and "TESTER"). When used, a key prefix may be composed of one or more sub-keys. In response, the data tree component 122 can perform a search on the tree data structure (e.g., binary search on the binary tree data structure) to identify an initial node associated with (e.g., that comprises a pointer to) the initial search key. The search is performed using at least one child pointer (e.g., left pointer or right pointer), in the set of child pointers, of a root node of the tree data structure.

For some embodiments, the data tree component 122 can receive a request (e.g., request from a software application on the host system 120) to traverse (based on an order) from an initial node of the tree data structure (e.g., new node or one identified by the data tree component 122 by a search) to a subsequent node of the tree data structure. For instance, the request may comprise a request to traverse to a next node or previous node within the tree data structure based on a consecutive key order. Such a request may be part of a request to iterate through nodes (e.g., scan up or scan down) from the initial node. Based on the request to traverse, the data tree component 122 can traverse from the initial node to the subsequent node of the tree data structure by at least one pointer in the set of linked-list pointers. For some embodiments, traversing to the subsequent node is performed without applying a lock on the tree data structure, thereby permitting reading of the tree data structure (e.g., by a lockless iterator/reader).

Depending on the embodiment, operations described herein with respect to the data tree component 122 may be performed on the host system 120, on the memory sub-system 110, or some combination of both. For instance, depending on the embodiment, the data tree component 122 may comprise logic (e.g., a set of machine instructions, such as firmware) or one or more components that causes the memory sub-system 110 (e.g., the memory sub-system controller 115) to perform operations described herein with respect to the data tree component 122. The data tree component 122 may comprise a tangible unit capable of performing operations described herein. Further details with regards to the operations of the data tree component 122 are described below.

Figure 2:
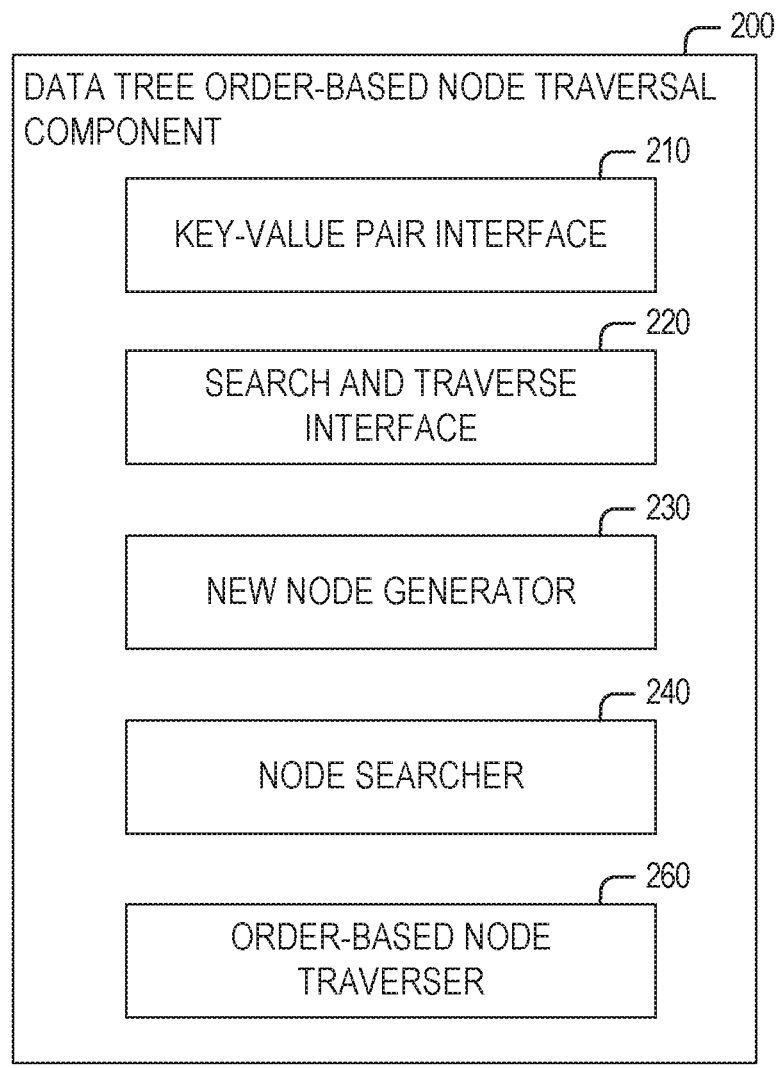
FIG. 2 is a block diagram of an example data tree with an order-based node traversal component, in accordance with some implementations of the present disclosure.

FIG. 2 is a block diagram of an example data tree with an order-based node traversal component 200 (hereafter, the data tree component 200), in accordance with some implementations of the present disclosure. As illustrated, the data tree component 200 comprises a key-value pair interface 210, a search and traverse interface 220, a new node generator 230, a node searcher 240, and an order-based node traverser 260. For some embodiments, the data tree component 200 may differ in components or arrangement (e.g., fewer or more components) than what is illustrated in FIG. 2.

The key-value pair interface 210 receives a key-value pair comprising a particular key and an associated value to store the key-value pair. As noted herein, the key-value pair interface 210 can receive the key-value pair in response to a client request on a host system (e.g., request from a software application on the host system).

The search and traverse interface 220 receives a key, searches the tree data structure for a value associated with the key, and returns (e.g., produces) the value (or a plurality of values in the case of traversal) if the value is located in the tree data structure. For some embodiments, the search and traverse interface 220 utilizes the node searcher 240, the order-based node traverser 260, or both to facilitate searching or searching and traversing the tree data structure.

The new node generator 230 generates, for a tree data structure stored on an in-memory layer), a new node associated with the particular key of the key-value pair received by the key-value pair interface 210. As noted herein, the new node generator 230 may generate the new node in response to the key-value pair interface 210 receiving the key-value pair. As also noted herein, the new node may comprise a set of child pointers to point to one or more child nodes of the new node in the tree data structure, and may comprise a set of linked-listed pointers to point to one or more adjacent nodes of linked-lists associated with the set of linked-listed pointers implemented within the tree data structure. Eventually, the new node generator 230 can insert the generated new node into the tree data structure.

The node searcher 240 receives a search request (e.g., request from a software application on the host system) comprising an initial search key. As noted herein, the initial search key may comprise a key prefix that includes a beginning portion of a key, which may be composed of one or more sub-keys. In response to receiving the search request, the node searcher 240 performs a search on the tree data structure to identify an initial node, associated with the initial search key, using at least one child pointer (e.g., left pointer or right pointer) in the set of child pointers, of a root node of the tree data structure.

The order-based node traverser 260 receives a request (e.g., request from a software application on the host system) to traverse (based on an order) from an initial node of the tree data structure (e.g., new node or one identified by the node searcher 240) to a subsequent node of the tree data structure. In response to receiving the request to traverse, the order-based node traverser 260 traverses from the initial node to the subsequent node of the tree data structure by at least one pointer in the set of linked-list pointers. As noted herein, the order-based node traverser 260 may perform the traversal to the subsequent node without applying a lock on the tree data structure, thereby permitting reading of the tree data structure (e.g., by a lockless iterator/reader).

Figure 3:
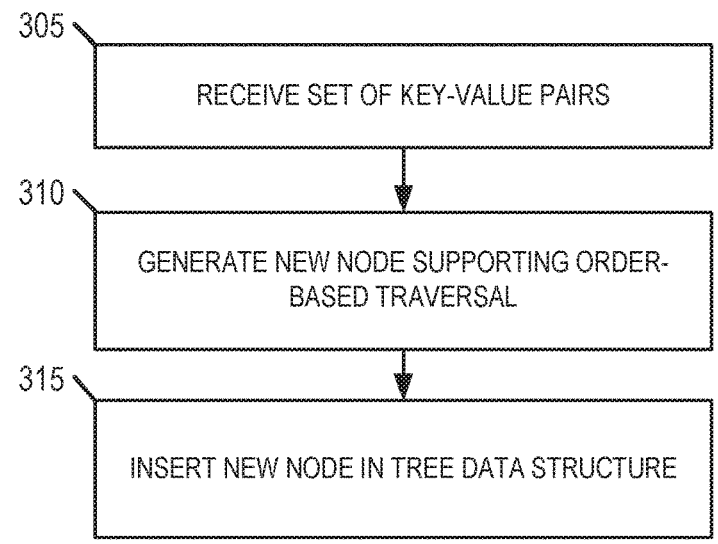
FIGS. 3 and 4 are flow diagrams of example methods for a tree data structure with order-based node traversal, in accordance with some implementations of the present disclosure.
Figure 4:
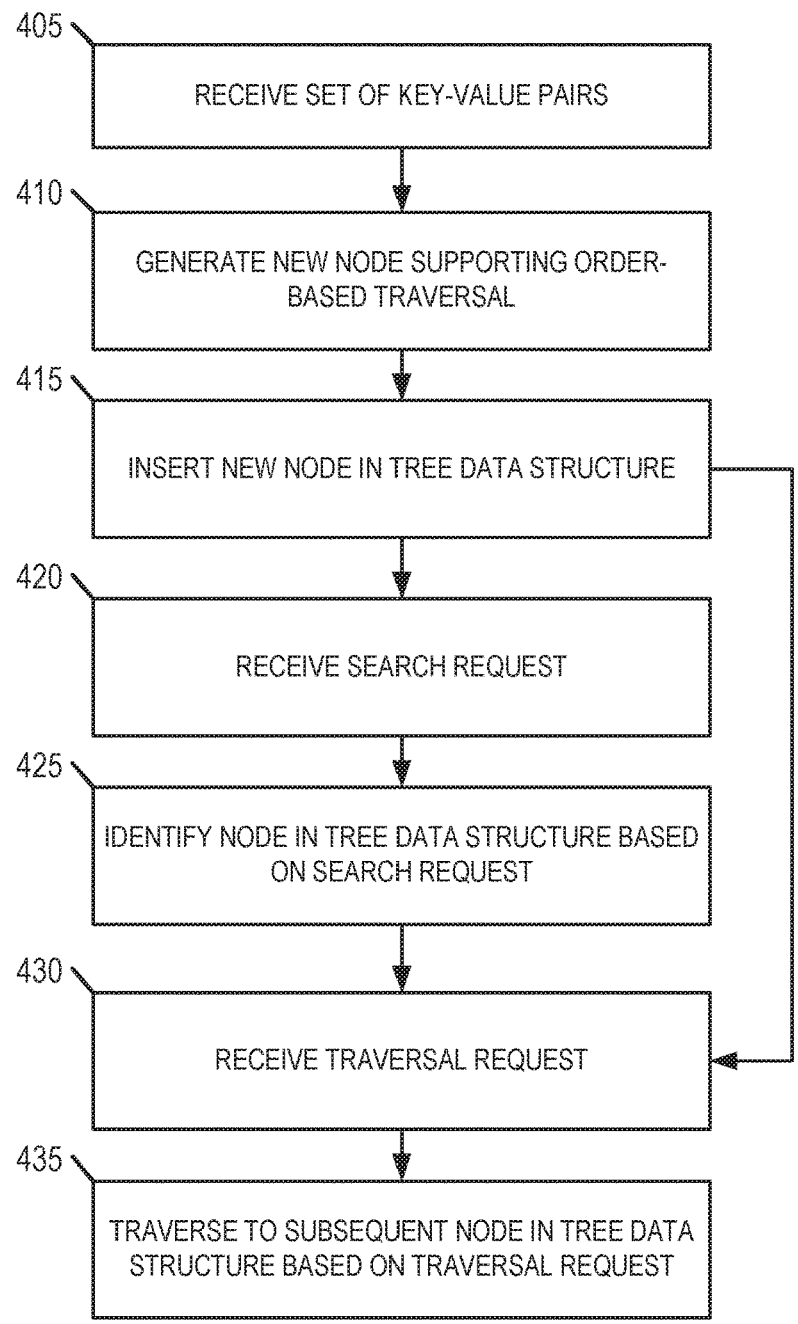

FIGS. 3 and 4 are flow diagrams of example methods for a tree data structure with order-based node traversal, in accordance with some implementations of the present disclosure. Any of methods 300, 400 of FIGS. 3 and 4 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, one or more methods 300, 400 of FIGS. 3 and 4 are performed by the host system 120 of FIG. 1. In these embodiments, the methods 300, 400 may be performed, at least in part, by the data tree component 122. Alternatively, one or more methods of FIGS. 3 and 4 are performed by the memory sub-system 110 of FIG. 1 (e.g., the processor 117 of the memory sub-system controller 115). Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. Operations of the methods 300, 400 of FIGS. 3 and 4 may be concurrently performed with respect to the KVS store.

Referring now to the method 300 of FIG. 3, at operation 305, a processing device of a host system (e.g., 120) receives (or otherwise retrieves) a key-value pair comprising a particular key and an associated value. As noted herein, the processing device may receive the key-value pair in response to a client request on the host system (e.g., request from a software application on the host system).

At operation 310, the processing device of the host system generates, for a tree data structure (e.g., stored on in-memory layer of a KVS), a new node associated with the particular key. The new node may comprise a set of child pointers to point to one or more child nodes of the new node in the tree data structure, and a set of linked-listed pointers to point to one or more adjacent nodes of linked-lists associated with the set of linked-listed pointers. Additionally, the new node may comprise a pointer to the particular key of the key-value pair, and can include a pointer to the particular value of the key-value pair, thereby associating the new node with the key-value pair received at operation 305. For some embodiments, the tree data structure comprises a binary tree data structure (e.g., bonsai tree data structure), and the set of child pointers comprises a first pointer to point to a first child node (e.g., left child node) of the new node, and a second pointer to point to a second child node (e.g., right child node) of the new node. For some embodiments, the set of linked-listed pointers comprises a next pointer to point to a next node in the tree data structure based on a forward key order, thereby facilitating forward key node traversal. Additionally, for some embodiments, the set of linked-listed pointers comprises a previous pointer to point to a previous node in the binary tree data structure based on a reverse key order, thereby facilitating backward key node traversal.

At operation 315, the processing device of the host system inserts the new node generated at operation 310 into the tree data structure. For some embodiments, the tree data structure comprises a RCU mechanism, and insertion of the new node into the tree data structure comprises using the RCU mechanism.

Referring now to the method 400 of FIG. 4, for some embodiments, operations 405, 410, 415 are respectively similar to operations 305, 310, 315 of the method 300 of FIG. 3.

At operation 420, the processing device of the host system receives a search request (e.g., request from a software application on the host system 120) comprising an initial search key. Depending on the embodiment, the method 400 can begin at operation 420 or operation 420 can follow (e.g., sometime after) operation 415. Fr©m operation 420, at operation 425, in response to receiving the search request, the processing device of the host system searches the tree data structure to identify an initial node, associated with the initial search key, using at least one child pointer in the set of child pointers, of a root node of the tree data structure. Subsequent to operation 425, the method 400 can proceed to operation 430.

From operation 415 or operation 425, at operation 430, the processing device of the host system receives a request (e.g., request from a software application on the host system) to traverse (based on an order) from an initial node of the tree data structure (e.g., new node or one identified at operation 425) to a subsequent node of the tree data structure. At operation 435, in response to receiving the request to traverse, the processing device of the host system traverses from the initial node to the subsequent node of the tree data structure by at least one pointer e.g., a previous pointer or a next pointer) in the set of linked-list pointers.

Figure 5:
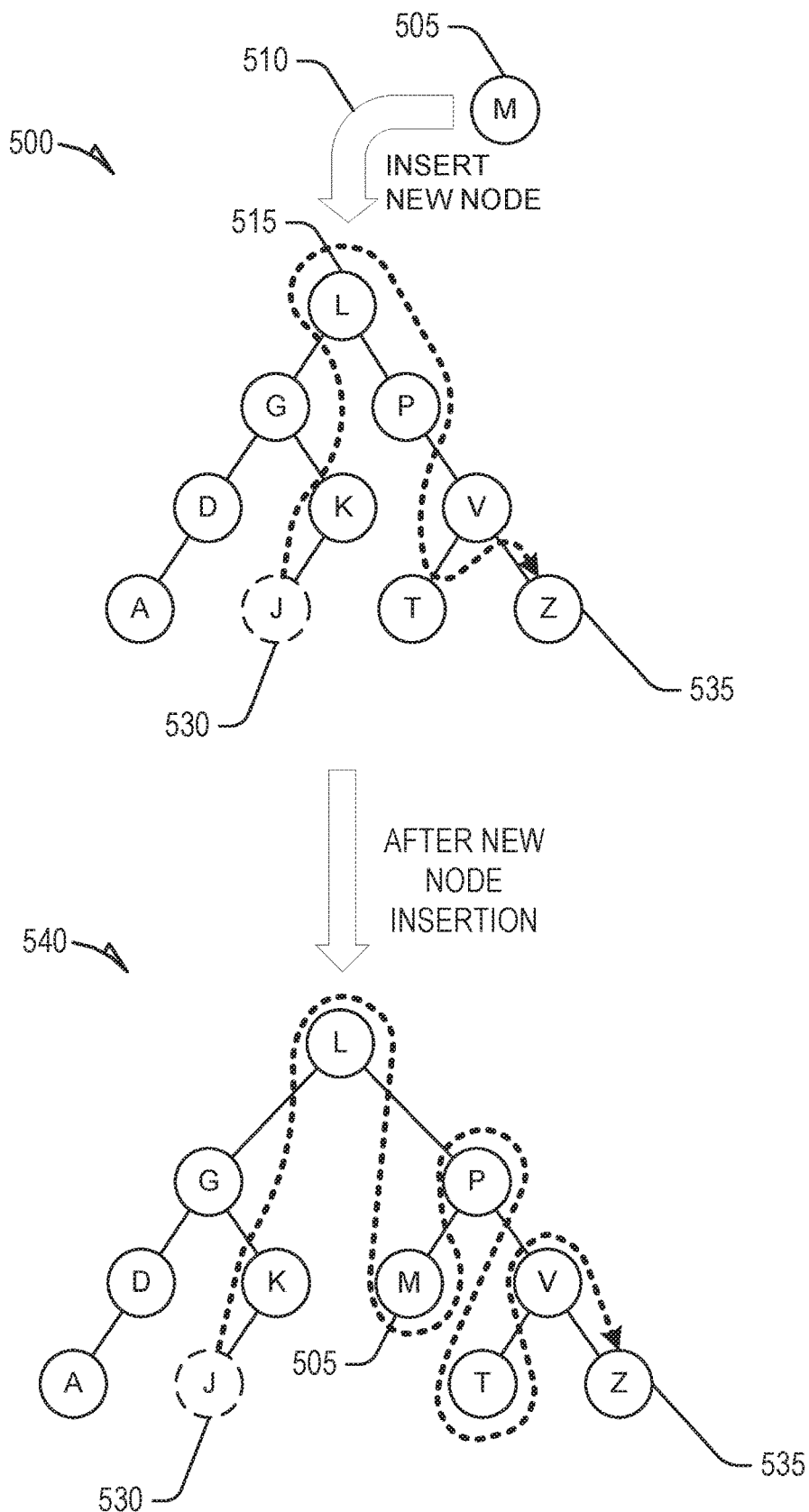
FIG. 5 provides diagrams illustrating example tree data structures that support order-based node traversal, in accordance with some implementations of the present disclosure.

FIG. 5 provides diagrams illustrating example tree data structures 500, 540 that support order-based node traversal, in accordance with some implementations of the present disclosure. As illustrated, the tree data structure 500 is a balanced, binary tree data structure storing key-value pairs for Keys A, D, G, K, L, P, T, V, Z. According to some embodiments, nodes of the tree data structure 500 comprise at least one pointer (e.g., forward pointer) to implement a linked list of nodes to facilitate key order traversal of nodes within the tree data structure 500. Based on the one pointer, a node traversal operation can, for example, traverse from initial node 530 associated with Key J to node 535 associated with Key Z (through nodes associated with Keys K, L, P, T, V) in forward key order. As noted herein, the traversal from initial node 530 to node 535 can be performed without having to visit any nodes more than once during the in-order traversal. Initial node 530 can be reached by performing a binary search starting from root node 515 of the tree data structure 500 down to initial node 530 using a search key of "J." As noted herein, the binary search may be performed using child node pointers stored in each node.

The tree data structure 540 represents the tree data structure 500 after new node 505 is generated and inserted (510) into the tree data structure 500. Accordingly, the pointer supporting forward key order traversal of nodes, within the tree data structure 540, permits node traversal from initial node 530 associated with Key J to node 535 associated with Key Z (through nodes associated with Keys K, L, M, P, T, V) in forward key order.

Figure 6:
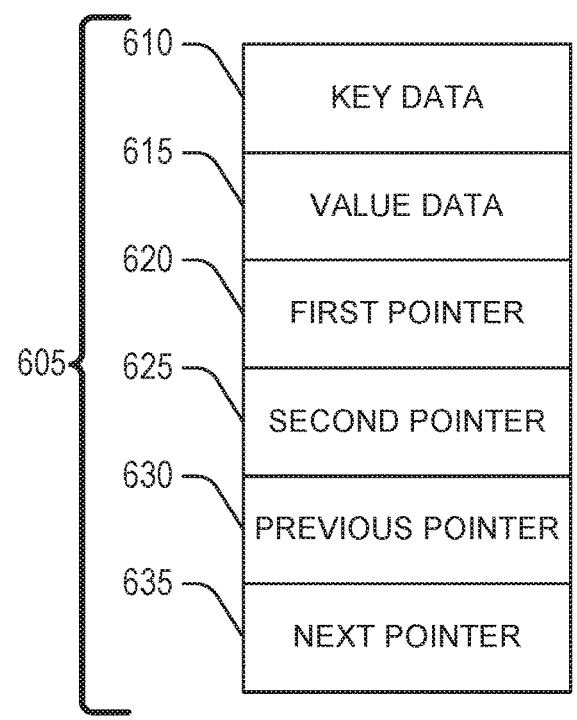
FIG. 6 provides a block diagram illustrating an example node of a tree data structure that supports order-based node traversal, in accordance with some implementations of the present disclosure.

FIG. 6 provides a block diagram illustrating an example node 600 of a tree data structure that supports order-based node traversal, in accordance with some implementations of the present disclosure. As illustrated, node 600 comprises a data structure 605, where the data structure 605 comprises key data 610, value data 615, a first pointer 620, a second pointer 625, a previous pointer 630, and a next pointer 635. According to some embodiments, the data structure 605 represents a node (e.g., root, internal, or leaf node) of a binary tree data structure. According to some embodiments, the first pointer 620 can point to a first child node (e.g., left child node) of node 600, and the second pointer 625 can point to a second child node (e.g., right child node) of node 600. For some embodiments, the previous pointer 630 can point to another node, within the binary tree data structure, that implements a linked-list data structure of nodes facilitating reverse order (e.g., reverse key order or reverse value order). Additionally, for some embodiments, the next pointer 635 can point to another node, within the binary tree data structure, that implements a linked-list data structure of nodes facilitating forward order (e.g., forward key order or forward value order). For some embodiments, the node structure may vary from the node structure illustrated by FIG. 6. For example, where a tree data structure comprises a node that can be connected to more than two child nodes, or the tree data structure implements more than two linked-list data structures, the data structure of a node could comprise different data elements (e.g., more or less data elements) than those illustrated in FIG. 6.

Figure 7:
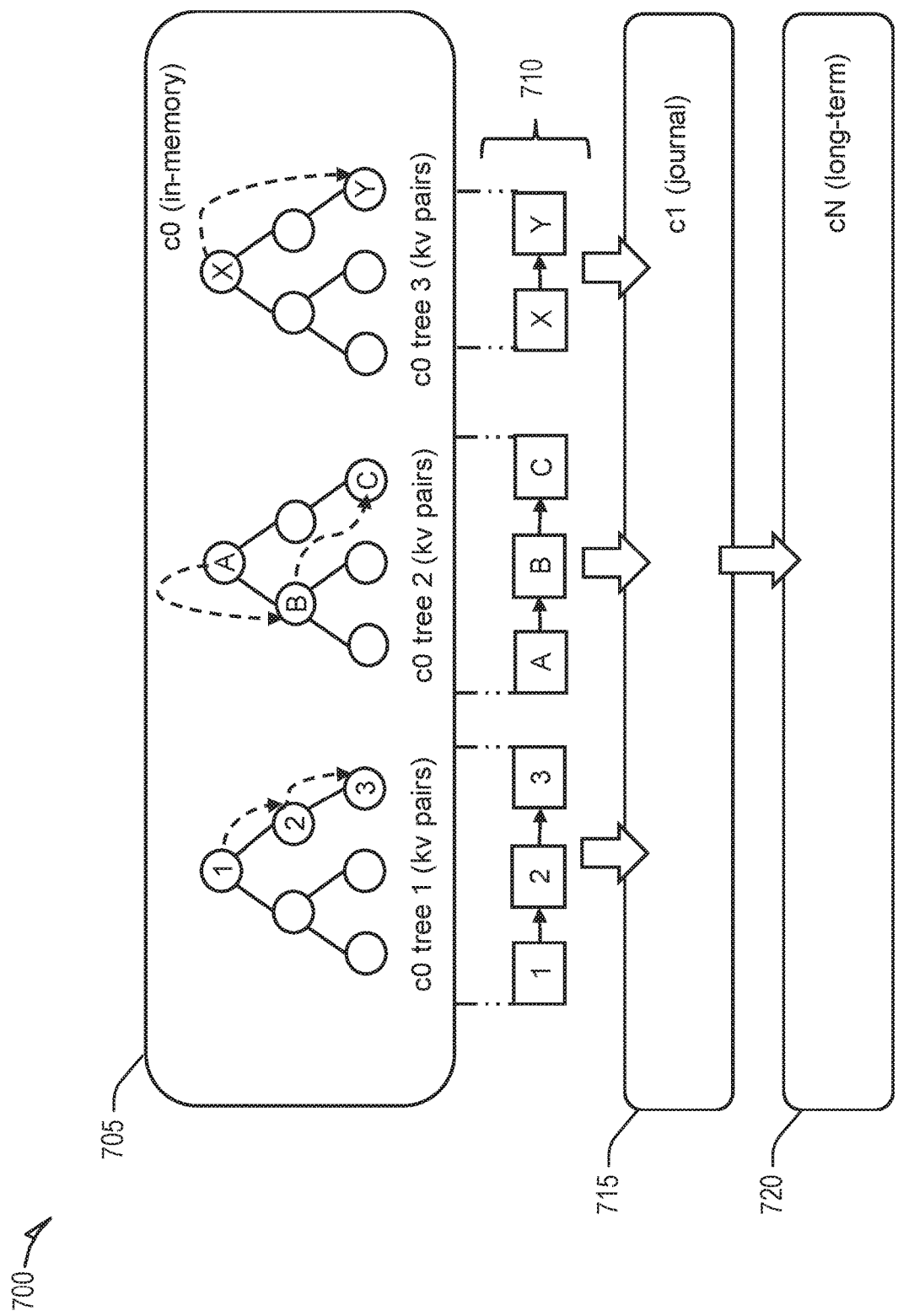
FIG. 7 is a block diagram illustrating operation of an example key-value store (KVS) that uses data tree order-based node traversal, in accordance with some implementations of the present disclosure.

FIG. 7 is a block diagram illustrating operation of an example key-value store (KVS) 700 that uses data tree order-based node traversal, in accordance with some implementations of the present disclosure. As shown, a KVS 700 comprises an in-memory layer 705 (also referred to herein as node c0 of the KVS 700), a journal layer 715 (also referred to herein as node el of the KVS 700), and a long-term layer 720 (also referred to herein as nodes cN of the KVS 700). Each stored kvset on the in-memory layer 705 comprises a binary tree data structure (e.g., bonsai data tree), supporting order-based node traversal as described herein, for storing key-value pairs (e.g., entered as put and delete operations that mutate key-value pairs). As illustrated, data tree 1 of c0 stores mutations to key-value pairs of keys 1, 2, 3 (K1, K2, and K3 respectively); data tree 2 of c0 stores mutations to key-value pairs of keys A, B, C (KA, KB, and KC respectively); and data tree 3 of c0 stores mutations to key-value pairs of key X and Y (KX and KY respectively).

Eventually, key and value data 710 of the key-value pair stored by (binary data tree structures of) the in-memory layer 705 are moved (e.g., committed) to the journal layer 715 for durability and persistence. The move may be in response, for example, to satisfaction of a condition (e.g., durability interval, such as 7 microseconds) to move key data and value data 710 of key-value pairs from the in-memory layer 705 to the journal layer 715. As illustrated in FIG. 7, eventually the key and value data is moved from the journal layer 715 to the long-term layer 720 for long-term/bulk data storage.

Figure 8:
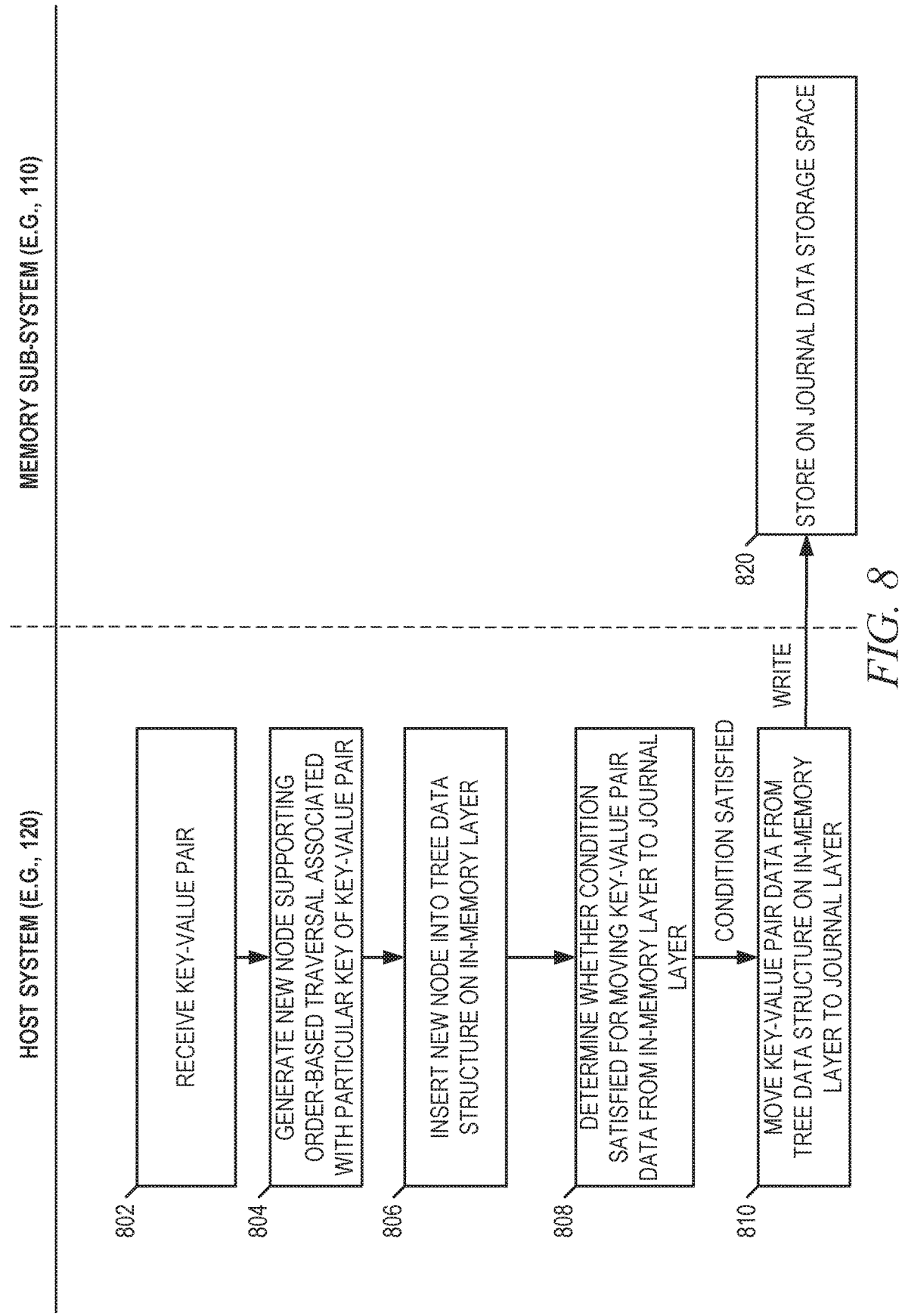
FIG. 8 provides an interaction diagram illustrating interactions between components of the computing environment in the context of an example embodiment in which a method for data tree order-based node traversal is performed.

FIG. 8 provides an interaction diagram illustrating interactions between components of the computing environment 100 in the context of an example embodiment in which a method for data tree order-based node traversal is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the host system 120. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIG. 8, the host system can comprise the host system 120, and the memory sub-system can comprise the memory sub-system 110, where one or more of the memory components 112A to 112N can implement data storage media for providing journal data storage space and long-term data storage space as described herein.

As shown, at operation 802, the host system 120 receives a key-value pair comprising a particular key and a particular value (associated with the key). At operation 804, the host system 120 responds to receiving the key-value pair by generating, for a tree data structure (stored on an in-memory layer of a KVS), a new node associated with the particular key, where the new node comprises a set of child pointers to point to one or more child nodes of the new node in the tree data structure, and a set of linked-listed pointers to point to one or more adjacent nodes of linked lists associated with the set of linked-listed pointers. At operation 806, the host system 120 inserts the new node generated at operation 804 into the tree data structure. At operation 808, the host system 120 determines whether a condition (e.g., durability interval, client request to flush, etc.) is satisfied for moving key-value pair data from the in-memory layer to a journal layer of the KVS. In response to the condition being satisfied, at operation 810, the host system 120 moves key-value pair data from the tree data structure on the in-memory layer to the journal layer. As a result, at operation 820, the memory sub-system 110 stores the key-value pair data from the in-memory layer to journal data storage space of the memory sub-system 110.

Figure 9:
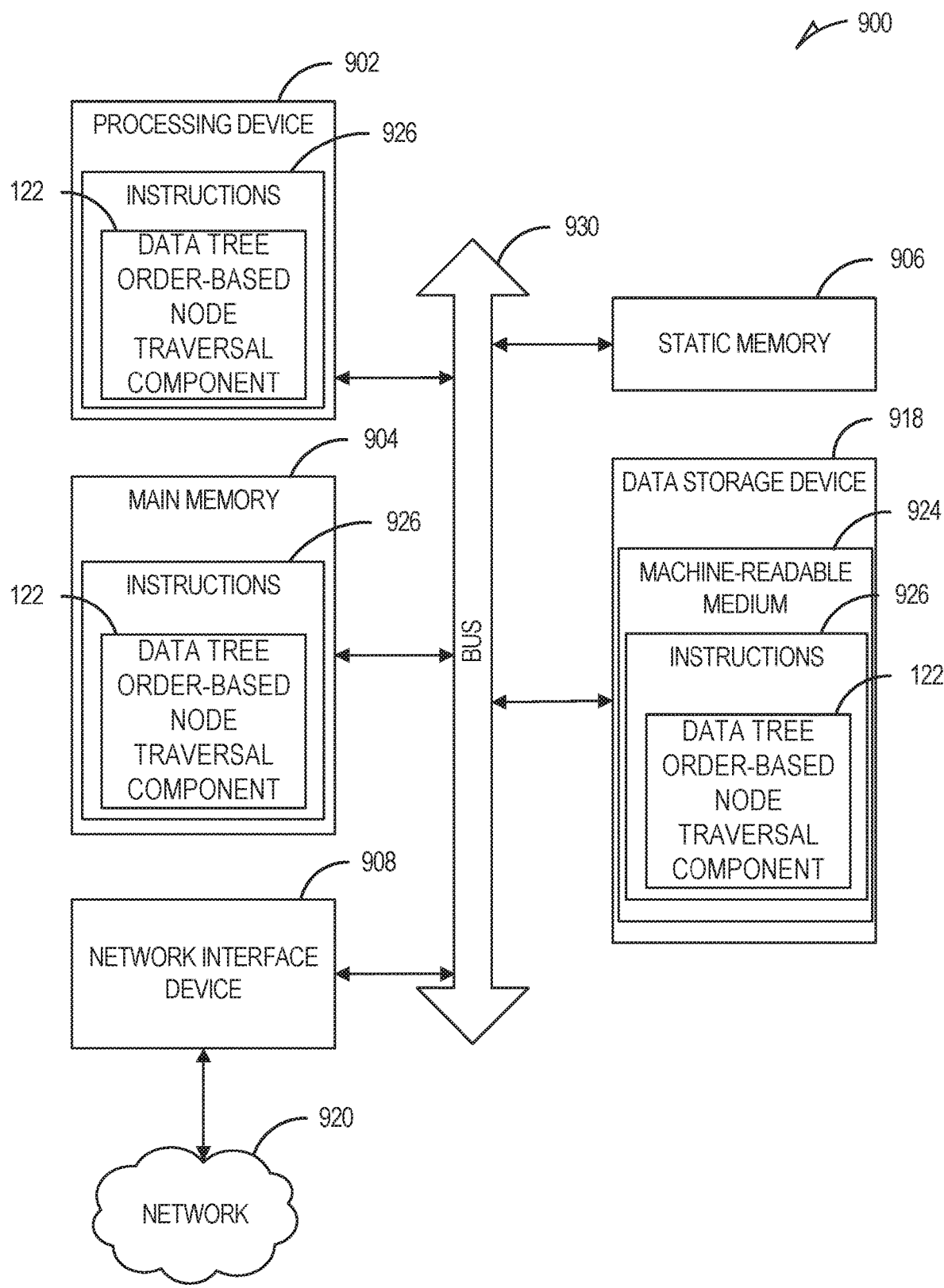
FIG. 9 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 9 illustrates an example machine in the form of a computer system 900 within which a set of instructions can be executed for causing the machine to perform any one or more of the methodologies discussed herein. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data tree component 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

The processing device 902 represents one or more general-purpose processing devices such as a microprocessor, a central processing unit, or the like. More particularly, the processing device 902 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 902 can also be one or more special-purpose processing devices such as an application-specific integrated circuit (ASIC), a field programmable gate array (FPGA), a digital signal processor (DSP), a network processor, or the like. The processing device 902 is configured to execute instructions 926 for performing the operations and steps discussed herein. The computer system 900 can further include a network interface device 908 to communicate over a network 920.

The data storage device 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage device 918, and/or main memory 904 can correspond to the memory sub-system 110 of FIG. 1.

In one embodiment, the instructions 926 include instructions to implement functionality corresponding to a parity calculator with partial calculation tracking (e.g., the data tree component 122 of FIG. 1). While the machine-readable storage medium 924 is shown in an example embodiment to be a single medium, the term "machine-readable storage medium" should be taken to include a single medium or multiple media that store the one or more sets of instructions 926. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMS); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from embodiments of the disclosure as set forth in the following claims. The specification and drawings are, accordingly, to be regarded in an illustrative sense rather than a restrictive sense.

EXAMPLES

Example 1 is a system comprising: volatile memory storing a binary tree data structure; and a processing device, operatively coupled to the volatile memory, configured to perform operations comprising: receiving a key-value pair comprising a particular key and a particular value; and in response to receiving the key-value pair: generating a new node associated with the particular key, the new node comprising a first pointer to point to a first child node (e.g., left child node) of the new node, a second pointer to point to a second child node (e.g., right child node) of the new node, a previous pointer to point to a previous node, and a next pointer to point to a next node, wherein based on a key order, the particular key is adjacent to both a first key associated with the previous node and a second key associated with the next node; and inserting the new node into the binary tree data structure to generate an updated binary tree data structure.

In Example 2, the subject matter of Example 1 optionally includes where the new node comprises a pointer to the particular key of the key-value pair.

In Example 3, the subject matter of Example 1 or Example 2 optionally includes where the new node comprises a pointer to the particular value of the key-value pair.

In Example 4, the subject matter of any one of Examples 1 to 3 optionally includes where the key order comprises a consecutive key order, the first key comprises a higher value than the particular key, and the second key comprises a lower value than the particular key.

In Example 5, the subject matter of any one of Examples 1 to 4 optionally includes where the operations further comprise: receiving a search request comprising an initial search key; in response to the search request, performing a binary search on the binary tree data structure to identify an initial node associated with the initial search key, the binary search being performed using at least one of a particular first pointer of a root node of the binary tree data structure or a particular second pointer of the root node.

In Example 6, the subject matter of any one of Examples 1 to 5 optionally includes where the initial search key comprises a key prefix.

In Example 7, the subject matter of any one of Examples 1 to 6 optionally includes where the operations further comprise: receiving a request to traverse from the new node of the binary tree data structure to a subsequent node of the binary tree data structure based on the key order; and based on the request to traverse, traversing to the subsequent node of the binary tree data structure by at least one of the previous pointer of the new node or the next pointer of the new node.

In Example 8, the subject matter of any one of Examples 1 to 7 optionally includes where the key order comprises a consecutive key order, the first key comprises a higher value than the particular key, the second key comprises a lower value than the particular key, and the traversing to the subsequent node by at least one of the previous pointer or the next pointer is determined based on whether the traversing comprises at least one of a scan up request or a scan down request.

In Example 9, the subject matter of any one of Examples 1 to 8 optionally includes where the traversing to the subsequent node is performed without applying a lock on the binary tree data structure.

In Example 10, the subject matter of any one of Examples 1 to 9 optionally includes where the binary tree data structure comprises a bonsai tree data structure.

In Example 11, the subject matter of any one of Examples 1 to 10 optionally includes where the binary tree data structure comprises a read-copy-update mechanism to control concurrent data access to the binary tree data structure by a plurality of processes.

In Example 12, the subject matter of any one of Examples 1 to 11 optionally includes where the inserting the new node into the binary tree data structure comprises using the read-copy-update mechanism.

In Example 13, the subject matter of any one of Examples 1 to 12 optionally includes where the binary tree data structure implements a key-value set in a sequence of key-value sets stored on the volatile memory.

In Example 14, the subject matter of any one of Examples 1 to 13 optionally includes where the system further comprises: a set of memory components for persistent storage of key-value pair data; wherein the operations further comprise: determining whether a condition is satisfied to move key-value pair data from the binary tree data structure; and in response to determining that the condition is satisfied, moving key-value pair data from the binary tree data structure to a new key-value set stored on the persistent data storage space.

Example 15 is a method comprising: receiving a key-value pair comprising a particular key and a particular value; and in response to receiving the key-value pair: generating, by a processing device for a binary tree data structure, a new node associated with the particular key, the new node comprising a first pointer to point to a first child node of the new node, a second pointer to point to a second child node of the new node, a previous pointer to point to a previous node, and a next pointer to point to a next node, wherein based on a key order, the particular key is adjacent to both a first key associated with the previous node and a second key associated with the next node; and inserting, by the processing device, the new node into the binary tree data structure to generate an updated binary tree data structure.

In Example 16, the subject matter of Example 15 optionally includes wherein the key order comprises a consecutive key order, the first key comprises a higher value than the particular key, and the second key comprises a lower value than the particular key.

In Example 17, the subject matter of Example 15 or Example 16 optionally includes where the method further comprises: receiving a search request comprising an initial search key; in response to the search request, performing a binary search on the binary tree data structure to identify an initial node associated with the initial search key, the binary search being performed using at least one of a particular first pointer of a root node of the binary tree data structure or a particular second pointer of the root node.

In Example 18, the subject matter of any one of Examples 15 to 17 optionally includes where the method further comprises: receiving a request to traverse from the new node of the binary tree data structure to a subsequent node of the binary tree data structure based on the key order; and based on the request to traverse, traversing to the subsequent node of the binary tree data structure by at least one of the previous pointer of the new node or the next pointer of the new node.

In Example 19, the subject matter of any one of Examples 15 to 18 optionally includes Where the key order comprises a consecutive key order, the first key comprises a higher value than the particular key, the second key comprises a lower value than the particular key, and the traversing to the subsequent node by at least one of the previous pointer or the next pointer is determined based on whether the traversing comprises at least one of a scan up request or a scan down request.

Example 20 is a non-transitory machine-readable storage medium comprising instructions that, when executed by a processing device, cause the processing device to: receive a key-value pair comprising a particular key and a particular value; and in response to receiving the key-value pair: generate, for a tree data structure, a new node associated with the particular key, the new node comprising a set of child pointers to point to one or more child nodes of the new node in the tree data structure, and a set of linked-listed pointers to point to one or more adjacent nodes of linked lists associated with the set of linked-listed pointers; and insert the new node into the binary tree data structure to generate an updated binary tree data structure.

What is claimed is:

1. A system comprising:
volatile memory storing a binary tree data structure; and
a processing device, operatively coupled to the volatile memory, configured to perform operations comprising:
receiving a key-value pair comprising a particular key and a particular value;
in response to receiving the key-value pair:
generating a new node associated with the particular key, the new node comprising a first pointer to point to a first child node of the new node, a second pointer to point to a second child node of the new node, a previous pointer to point to a previous node, and a next pointer to point to a next node, wherein based on a key order, the particular key is adjacent to both a first key associated with the previous node and a second key associated with the next node; and
inserting the new node into the binary tree data structure to generate an updated binary tree data structure;
receiving a request to traverse from the new node of the updated binary tree data structure to a subsequent node of the updated binary tree data structure based on the key order; and
based on the request to traverse, traversing to the subsequent node of the updated binary tree data structure by at least one of the previous pointer of the new node or the next pointer of the new node.

2. The system of claim 1, wherein the new node comprises a pointer to the particular key of the key-value pair.

3. The system of claim 1, wherein the new node comprises a pointer to the particular value of the key-value pair.

4. The system of claim 1, wherein the key order comprises a consecutive key order, the first key comprises a higher value than the particular key, and the second key comprises a lower value than the particular key.

5. The system of claim 1, wherein the operations further comprise:
receiving a search request comprising an initial search key; and
in response to the search request, performing a binary search on the binary tree data structure to identify an initial node associated with the initial search key, the binary search being performed using at least one of a particular first pointer of a root node of the binary tree data structure or a particular second pointer of the root node.

6. The system of claim 5, wherein the initial search key comprises a key prefix.

7. The system of claim 1, wherein the key order comprises a consecutive key order, the first key comprises a higher value than the particular key, the second key comprises a lower value than the particular key, and the traversing to the subsequent node by at least one of the previous pointer or the next pointer is determined based on whether the traversing comprises at least one of a scan up request or a scan down request.

8. The system of claim 1, wherein the traversing to the subsequent node is performed without applying a lock on the updated binary tree data structure.

9. The system of claim 1, wherein the binary tree data structure comprises a bonsai tree data structure.

10. The system of claim 1, wherein the binary tree data structure comprises a read-copy-update mechanism to control concurrent data access to the binary tree data structure by a plurality of processes.

11. The system of claim 10, wherein the inserting the new node into the binary tree data structure comprises using the read-copy-update mechanism.

12. The system of claim 1, wherein the binary tree data structure implements a key-value set in a sequence of key-value sets stored on the volatile memory.

13. The system of claim 1, further comprising:
a set of memory components for persistent storage of key-value pair ata;
wherein the operations further comprise:
determining whether a condition is satisfied to move key-value pair data from the binary tree data structure; and
in response to determining that the condition is satisfied, moving key-value pair data from the binary tree data structure to a new key-value set stored on persistent data storage space.

14. A method comprising:
receiving a key-value pair comprising a particular key and a particular value;
in response to receiving the key-value pair:
generating, by a processing device, for a binary tree data structure, a new node associated with the particular key, the new node comprising a first pointer to point to a first child node of the new node, a second pointer to point to a second child node of the new node, a previous pointer to point to a previous node, and a next pointer to point to a next node, wherein based on a key order, the particular key is adjacent to both a first key associated with the previous node and a second key associated with the next node; and
inserting, by the processing device, the new node into the binary tree data structure to generate an updated binary tree data structure;
receiving a request to traverse from the new node of the updated binary tree data structure to a subsequent node of the updated binary tree data structure based on the key order; and
based on the request to traverse, traversing to the subsequent node of the updated binary tree data structure by at least one of the previous pointer of the new node or the next pointer of the new node.

15. The method of claim 14, wherein the key order comprises a consecutive key order, the first key comprises a higher value than the particular key, and the second key comprises a lower value than the particular key.

16. The method of claim 14, further comprising:
receiving a search request comprising an initial search key; and
in response to the search request, performing a binary search on the binary tree data structure to identify an initial node associated with the initial search key, the binary search being performed using at least one of a particular first pointer of a root node of the binary tree data structure or a particular second pointer of the root node.

17. The method of claim 14, wherein the key order comprises a consecutive key order, the first key comprises a higher value than the particular key, the second key comprises a lower value than the particular key, and the traversing to the subsequent node by at least one of the previous pointer or the next pointer is determined based on whether the traversing comprises at least one of a scan up request or a scan down request.

18. A non-transitory machine-readable storage medium comprising instructions that, when executed by a processing device, cause the processing device to perform operations comprising:
receiving a key-value pair comprising a particular key and a particular value;
in response to receiving the key-value pair:
generating, for a binary tree data structure, a new node associated with the particular key, the new node comprising a first pointer to point to a first child node of the new node, a second pointer to point to a second child node of the new node, a previous pointer to point to a previous node, and a next pointer to point to a next node, wherein based on a key order, the particular key is adjacent to both a first key associated with the previous node and a second key associated with the next node; and
inserting the new node into the binary tree data structure to generate an updated binary tree data structure;
receiving a request to traverse from the new node of the updated binary tree data structure to a subsequent node of the updated binary tree data structure based on the key order; and
based on the request to traverse, traversing to the subsequent node of the updated binary tree data structure by at least one of the previous pointer of the new node or the next pointer of the new node.

19. The non-transitory machine-readable storage medium of claim 18, wherein the key order comprises a consecutive key order, the first key comprises a higher value than the particular key, the second key comprises a lower value than the particular key, and the traversing to the subsequent node by at least one of the previous pointer or the next pointer is determined based on whether the traversing comprises at least one of a scan up request or a scan down request.

20. The non-transitory machine-readable storage medium of claim 18, wherein the traversing to the subsequent node is performed without applying a lock on the updated binary tree data structure.

* * * * *